(12) United States Patent
Chang et al.

(10) Patent No.: US 12,315,048 B2
(45) Date of Patent: May 27, 2025

(54) METHOD OF GENERATING IMAGE SAMPLE, METHOD OF RECOGNIZING TEXT, DEVICE AND MEDIUM

(71) Applicant: BEIJING BAIDU NETCOM SCIENCE TECHNOLOGY CO., LTD., Beijing (CN)

(72) Inventors: Zhanguo Chang, Beijing (CN); Yi Lv, Beijing (CN); Tiansheng Deng, Beijing (CN); Ting Yun, Beijing (CN)

(73) Assignee: BEIJING SAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/020,903

(22) PCT Filed: Jul. 25, 2022

(86) PCT No.: PCT/CN2022/107554
§ 371 (c)(1),
(2) Date: Feb. 10, 2023

(87) PCT Pub. No.: WO2023/134143
PCT Pub. Date: Jul. 20, 2023

(65) Prior Publication Data
US 2024/0303880 A1    Sep. 12, 2024

(30) Foreign Application Priority Data
Jan. 17, 2022  (CN) .......................... 202210051663.0

(51) Int. Cl.
*G06T 11/00*    (2006.01)
*G06T 3/02*    (2024.01)
(Continued)

(52) U.S. Cl.
CPC .............. *G06T 11/203* (2013.01); *G06T 3/02* (2024.01); *G06T 3/60* (2013.01); *G06T 7/10* (2017.01); *G06T 11/60* (2013.01)

(58) Field of Classification Search
None
See application file for complete search history.

(56) References Cited

U.S. PATENT DOCUMENTS 5,818,963 A  * 10/1998 Murdock ............... G06V 30/36
382/187
5,911,005 A  *  6/1999 Uchiyama ........ G06V 30/18095
382/187
(Continued)

FOREIGN PATENT DOCUMENTS

CN      109299663     2/2019
CN      109493400     3/2019
(Continued)

OTHER PUBLICATIONS

Office Action issued in corresponding Japanese Patent Application No. 2023-509762, dated Feb. 26, 2024.
(Continued)

*Primary Examiner* — Martin Mushambo
(74) *Attorney, Agent, or Firm* — PILLSBURY WINTHROP SHAW PITTMAN, LLP

(57) ABSTRACT

A method of generating an image sample, which relates to a field of an artificial intelligence technology, in particular to fields of a deep learning technology and a computer vision technology. The method includes: generating a handwritten text image according to at least one handwritten sample image; and generating a target sample image with an annotation box according to the handwritten text image and a background image, where the annotation box is used to represent a region in which the handwritten text image is located in the background image. The present disclosure (Continued)

further provides a method of recognizing a text, an electronic device and a storage medium.

18 Claims, 7 Drawing Sheets

(51) Int. Cl.
*G06T 3/60* (2006.01)
*G06T 7/10* (2017.01)
*G06T 11/20* (2006.01)
*G06T 11/60* (2006.01)

(56) References Cited

U.S. PATENT DOCUMENTS

| | | | | |
|---|---|---|---|---|
| 6,298,154 | B1* | 10/2001 | Cok | G06T 11/203 |
| | | | | 382/254 |
| 7,391,917 | B2* | 6/2008 | Ohta | G06F 16/56 |
| | | | | 382/253 |
| 10,402,640 | B1* | 9/2019 | Becker | G06V 30/412 |
| 10,671,892 | B1* | 6/2020 | Daskalov | G06F 18/217 |
| 10,755,120 | B2* | 8/2020 | Fu | G06N 3/084 |
| 11,210,470 | B2* | 12/2021 | Kim | G06F 40/289 |
| 11,341,758 | B1* | 5/2022 | Stoltenberg | G06N 3/08 |
| 11,366,958 | B1* | 6/2022 | Tay | G06F 16/3344 |
| 11,380,033 | B2* | 7/2022 | Sousa | G06N 3/045 |
| 11,836,996 | B2* | 12/2023 | Zhang | G06F 18/2178 |
| 11,928,872 | B2* | 3/2024 | Qiao | G06V 10/26 |
| 12,020,152 | B2* | 6/2024 | Goodman | G06F 18/2411 |
| 12,067,351 | B2* | 8/2024 | Schwiebert | G06F 40/151 |
| 2003/0198386 | A1* | 10/2003 | Luo | G06V 20/62 |
| | | | | 382/199 |
| 2005/0259866 | A1* | 11/2005 | Jacobs | G06V 30/18029 |
| | | | | 382/229 |
| 2009/0109227 | A1* | 4/2009 | Leroy | G06T 11/203 |
| | | | | 345/467 |
| 2011/0316882 | A1* | 12/2011 | Blose | H04N 1/3871 |
| | | | | 345/636 |
| 2012/0263352 | A1* | 10/2012 | Fan | G06V 20/63 |
| | | | | 382/105 |
| 2012/0299881 | A1* | 11/2012 | De Muelenaere | G06F 3/038 |
| | | | | 345/179 |
| 2014/0002379 | A1* | 1/2014 | Hsieh | G06F 3/04883 |
| | | | | 345/173 |
| 2014/0347399 | A1* | 11/2014 | Moffatt | G06T 3/4007 |
| | | | | 345/667 |
| 2019/0095730 | A1* | 3/2019 | Fu | G06V 10/764 |
| 2019/0272438 | A1* | 9/2019 | Liu | G06N 3/045 |
| 2019/0392207 | A1* | 12/2019 | Young | G06V 30/274 |
| 2021/0110205 | A1* | 4/2021 | Karimi | G06V 30/32 |
| 2021/0374455 | A1* | 12/2021 | Ghosh | G06V 30/413 |
| 2022/0012484 | A1* | 1/2022 | Bulatov | G06V 20/46 |
| 2022/0122367 | A1* | 4/2022 | O'Gara | G06F 16/5846 |
| 2022/0301334 | A1* | 9/2022 | Yu | G06V 30/412 |
| 2023/0037272 | A1* | 2/2023 | He | G06V 30/1801 |

FOREIGN PATENT DOCUMENTS

| | | |
|---|---|---|
| CN | 109766879 | 5/2019 |
| CN | 110163285 | 8/2019 |
| CN | 110490232 | 11/2019 |
| CN | 111951259 | 11/2020 |
| CN | 112990205 | 6/2021 |
| CN | 113011299 | 6/2021 |
| CN | 113012265 | 6/2021 |
| CN | 113313111 | 8/2021 |
| CN | 113537189 | 10/2021 |
| CN | 113723402 | 11/2021 |
| CN | 114419613 | 4/2022 |
| JP | 2013-097561 | 5/2013 |

OTHER PUBLICATIONS

International Search Report and Written Opinion issued in corresponding International Application No. PCT/CN2022/107554, dated Sep. 9, 2022.

Office Action issued in corresponding Chinese Patent Application No. 202210051663.0, dated Sep. 5, 2022.

Office Action issued in corresponding Chinese Patent Application No. 202210051663.0, dated Dec. 21, 2022.

\* cited by examiner

200

| A handwritten text image is generated according to at least one handwritten sample image | S210 |

| A target sample image with an annotation box is generated according to the handwritten text image and a background image | S220 |

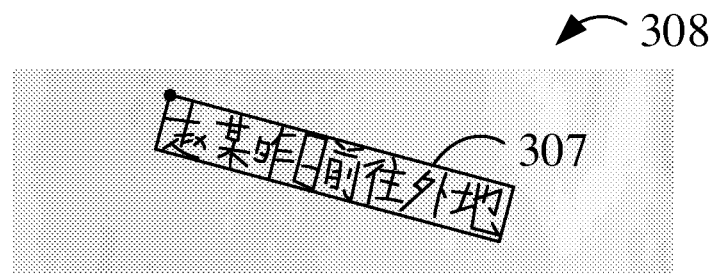
FIG. 3E
400
| A target detection is performed on a text image by using a detection model, so as to obtain a text image with a detection box | — S410 |
↓
| The text image with the detection box is segmented to obtain a to-be-recognized image | — S420 |
↓
| A text recognition is performed according to the to-be-recognized image, so as to obtain the text of the text image | — S430 |
FIG. 4
FIG. 5

METHOD OF GENERATING IMAGE SAMPLE, METHOD OF RECOGNIZING TEXT, DEVICE AND MEDIUM

This application is the U.S. national phase entry of PCT Patent Application No. PCT/CN2022/107554, filed on Jul. 25, 2022, which claims priority to Chinese Patent Application No. 202210051663.0, filed on Jan. 17, 2022, the entire content of which is incorporated herein in its entirety by reference.

TECHNICAL FIELD

The present disclosure relates to a field of an artificial intelligence technology, in particular to fields of a deep learning technology and a computer vision technology, and more specifically, to a method of generating an image sample, a method of recognizing a text, an electronic device, and a storage medium.

BACKGROUND

A text recognition may be performed on a printed text by using a deep learning model. However, the text recognition may be performed manually on a handwritten text.

SUMMARY

The present disclosure provides a method of generating an image sample, a method of recognizing a text, an electronic device, and a storage medium.

According to an first aspect, a method of generating an image sample is provided, including: generating a handwritten text image according to at least one handwritten sample image; and generating a target sample image with an annotation box according to the handwritten text image and a background image, where the annotation box is configured to represent a region in which the handwritten text image is located in the background image.

According to an aspect, a method of recognizing a text is provided, including: performing a target detection on a text image by using a detection model, so as to obtain a text image with a detection box, where the detection box is configured to represent a region in which a text of the text image is located; segmenting the text image with the detection box to obtain a to-be-recognized image; and performing a text recognition according to the to-be-recognized image, so as to obtain the text of the text image, where the detection model is trained according to a plurality of sample images generated by the method provided by the present disclosure.

According to an aspect, an electronic device is provided, including: at least one processor; and a memory communicatively connected to the at least one processor, where the memory stores instructions executable by the at least one processor, and the instructions, when executed by the at least one processor, are configured to cause the at least one processor to implement the methods provided by the present disclosure.

According to an aspect, a non-transitory computer-readable storage medium having computer instructions therein is provided, where the computer instructions are configured to cause a computer to implement the methods provided by the present disclosure.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, wherein:

FIG. 3E shows a schematic diagram of a target sample image according to an embodiment of the present disclosure;

FIG. 4 shows a flowchart of a method of recognizing a text according to an embodiment of the present disclosure;

FIG. 5 shows a schematic diagram of a recognition image sample according to an embodiment of the present disclosure;

DETAILED DESCRIPTION OF EMBODIMENTS

Exemplary embodiments of the present disclosure will be described below with reference to accompanying drawings, which include various details of the embodiments of the present disclosure to facilitate understanding and should be considered as merely exemplary. Therefore, those of ordinary skilled in the art should realize that various changes and modifications may be made to embodiments described herein without departing from the scope and spirit of the present disclosure. Likewise, for clarity and conciseness, descriptions of well-known functions and structures are omitted in the following description.

A handwritten text has a variety of handwritings and has no uniform style. The handwritten text may be recognized manually, but the manual recognition requires a high labor cost. The handwritten text may also be recognized by using a deep learning model, but fewer image samples corresponding to the handwritten text are provided, which may be difficult to effectively train the deep learning model.

Figures 1, 2:
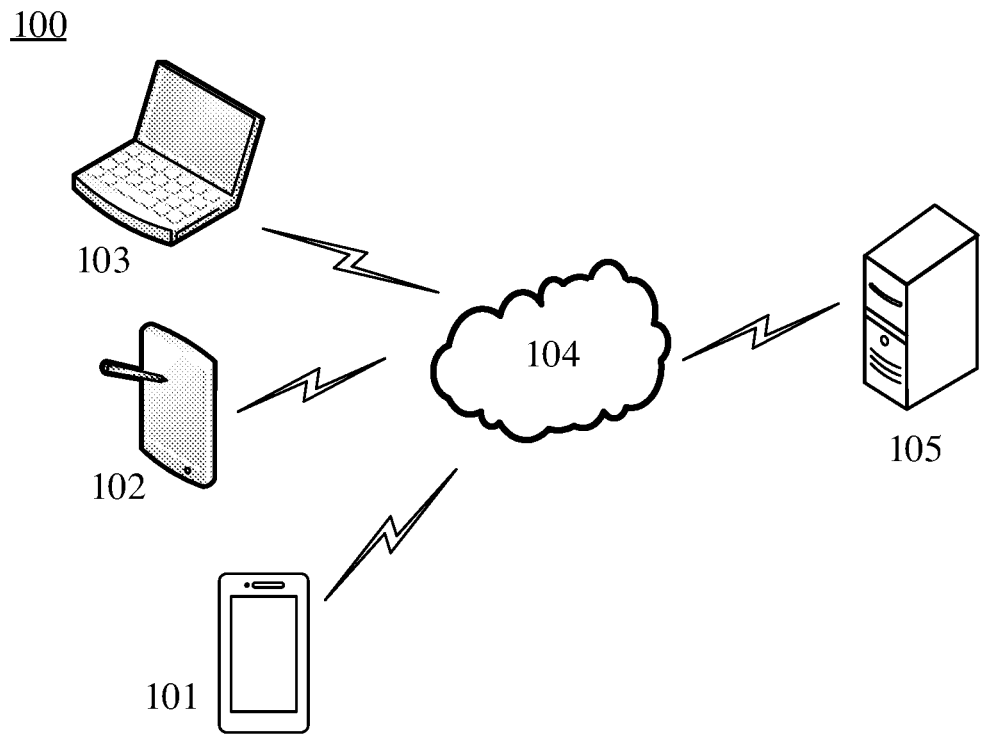
FIG. 1 shows an exemplary system architecture diagram to which a method of generating an image sample and a method of recognizing a text may be applied according to an embodiment of the present disclosure.
FIG. 2 shows a flowchart of a method of generating an image sample according to an embodiment of the present disclosure.

FIG. 1 shows an exemplary system architecture diagram to which a method of generating an image sample and a method of recognizing a text may be applied according to an embodiment of the present disclosure.

It should be noted that FIG. 1 only shows an example of a system architecture to which embodiments of the present disclosure may be applied to help those skilled in the art understand the technical content of the present disclosure, but it does not mean that embodiments of the present disclosure may not be applied to other devices, systems, environments or scenarios.

As shown in FIG. 1, a system architecture 100 according to such embodiments may include terminal devices 101, 102, 103, a network 104 and a server 105. The network 104 is a medium used to provide a communication link between the terminal devices 101, 102, 103 and the server 105. The network 104 may include various connection types, such as wired and/or wireless communication links, etc.

The terminal devices 101, 102, 103 used by a user may interact with the server 105 via the network 104, so as to receive or send messages, etc. The terminal devices 101, 102, 103 may be various electronic devices having display screens and supporting a web browsing, including but not limited to smartphones, tablet computers, laptop computers, desktop computers, etc.

The server 105 may be a server that provides various services, such as a background management server (for example only) that provides a support for a website browsed by the user using the terminal devices 101, 102, 103. The background management server may analyze and process a received user request and other data, and feed back a processing result (e.g., web page, information or data acquired or generated according to the user request) to the terminal devices.

It should be noted that the method of generating the image sample and/or the method of recognizing the text provided by embodiments of the present disclosure may generally be performed by the server 105. Accordingly, the apparatus of generating the image sample and/or the apparatus of recognizing the text provided by embodiments of the present disclosure may generally be provided in the server 105. The method of generating the image sample and/or the method of recognizing the text provided by embodiments of the present disclosure may also be performed by a server or server cluster different from the server 105 and capable of communicating with the terminal devices 101, 102, 103 and/or the server 105. Accordingly, the apparatus method of generating the image sample and/or the apparatus of recognizing the text provided by embodiments of the present disclosure may also be provided in the server or server cluster different from the server 105 and capable of communicating with the terminal devices 101, 102, 103 and/or the server 105.

FIG. 2 shows a flowchart of a method of generating an image sample according to an embodiment of the present disclosure.

As shown in FIG. 2, a method 200 may include operations S210 to S220.

In operation S210, a handwritten text image is generated according to at least one handwritten sample image.

For example, the handwritten sample image may be an image of a handwritten text.

For example, the handwritten text image may be an image of a handwritten text corresponding to a preset text sequence. In an example, the preset text sequence may be " 赵某昨日前往外地 (Chinese characters)". The handwritten text image corresponding to the preset text sequence may be generated from eight handwritten sample images.

In operation S220, a target sample image with an annotation box is generated according to the handwritten text image and a background image.

In embodiments of the present disclosure, the annotation box may be used to represent a region in which the handwritten text image is located in the background image.

For example, the background image may be an image corresponding to a video frame.

For example, an image synthesis may be performed according to the annotation box, the handwritten text image and the background image, so as to generate the target sample image. In an example, the image synthesis may be performed according to a handwritten text image corresponding to the text sequence " 赵某昨日前往外地 ", an annotation box of this handwritten text image and a background image, so as to obtain a target sample image.

Through embodiments of the present disclosure, a large number of sample images with annotation boxes are generated, so that a handwritten text may be efficiently detected by a detection model trained according to these sample images.

Through embodiments of the present disclosure, a large number of sample images for training the detection model may be generated to improve a training effect of the detection model. For example, a sample image with a detection box may be obtained by inputting the sample image into the detection model. The detection box may be used to represent a region in which a text of the sample image is located. In an example, the detection model may be a DBNet (Differentiable Binarization Network) model.

In some embodiments, the generating a target sample image with an annotation box according to the handwritten text image and a background image includes: adding an inclined handwritten text image to the background image; generating the annotation box according to the inclined handwritten text image; and generating the target sample image according to the annotation box.

For example, the inclined handwritten text image is obtained by rotating the handwritten text image.

In an example, the handwritten text image may be rotated according to an inclination angle.

In an example, a value range of the inclination angle may be −90° to 90°.

In an example, the inclination angle may be randomly generated to rotate the handwritten text image. In an example, the inclination angle of 30° is taken as an example. The handwritten text image may be rotated clockwise for 30° based on an upper-left vertex of the handwritten text image, so as to obtain the inclined handwritten text image.

For example, the inclined handwritten text image may be added to the background image by various methods.

In embodiments of the present disclosure, the annotation box may be used to represent a region in which the inclined handwritten text image is located in the background image.

For example, an angle between a width direction of the annotation box and a width direction of the background image may be determined according to the inclination angle. In an example, the inclination angle of 30° is taken as an example. The angle between the width direction of the annotation box and the width direction of the background image may also be 30°. Next, a width of the annotation box and a height of the annotation box may be determined, so that a region determined by the annotation box is greater than or equal to the region in which the inclined handwritten text image is located. A large number of sample images with inclined annotation boxes are generated, so that a detection model trained according to the sample images may efficiently detect an inclined handwritten text.

In some embodiments, the adding an inclined handwritten text image to the background image includes: determining a target pixel; and adding the inclined handwritten text image to the background image according to the target pixel and a preset pixel in the inclined handwritten text image.

For example, the target pixel is in the background image.

For example, a pixel in the background image may be randomly determined as the target pixel.

For example, the preset pixel may be a pixel corresponding to an upper-left vertex of the handwritten text image.

For example, after the inclined handwritten text image is added to the background image, the preset pixel overlaps the target pixel. A coordinate of the preset pixel in the background image may be a coordinate of the target pixel.

In some embodiments, the generating the annotation box according to the inclined handwritten text image includes: determining a width of the handwritten text image and a height of the handwritten text image according to a handwritten sample attribute; determining a vertex coordinate of the annotation box according to a coordinate of the target pixel, an inclination angle of the inclined handwritten text image, the width of the handwritten text image, and the height of the handwritten text image; and generating the annotation box according to the vertex coordinate of the annotation box.

For example, the handwritten sample attribute may include a height of the handwritten sample image and a width of the handwritten sample image. In an example, the heights of various handwritten sample images may be the same, while the widths of various handwritten sample images may be different. Based on this, the height of the handwritten text image may be the height of the handwritten sample image. The width of the handwritten text image may be a sum of widths of multiple handwritten sample images.

For example, after the width of the handwritten text image and the height of the handwritten text image are determined, the vertex coordinate of the annotation box may be determined in combination with the coordinate of the target pixel and the inclination angle. In an example, at least three vertex coordinates of the annotation box may be determined according to the coordinate of the target pixel, the inclination angle, the width of the handwritten text image, the height of the handwritten text image, a cosine function and a sine function. In this way, the annotation box may be determined according to the three vertex coordinates. For example, the annotation box may be determined according to the three vertex coordinates and the coordinate of the target pixel.

In some embodiments, the generating a handwritten text image according to at least one handwritten sample image includes: determining the at least one handwritten sample image according to a preset text sequence; and generating the handwritten text image according to the at least one handwritten sample image and a handwritten sample attribute.

For example, the handwritten sample attribute include a height of the handwritten sample image and a width of the handwritten sample image.

For example, a handwritten sample image corresponding to the preset text sequence may be acquired to determine the at least one handwritten sample image.

For example, the handwritten sample attribute may also include a color of a handwritten sample and a rotation angle of the handwritten sample. The rotation angle may refer to an angle that the handwritten sample has. In an example, the color of the handwritten sample as black and the rotation angle as 10° are taken as an example. After the at least one handwritten sample image is acquired, a font color of each handwritten sample image is adjusted to black, and each handwritten sample image is rotated by 10°. Next, the handwritten text image may be generated according to an order of a text in the preset text sequence.

Figure 3A:
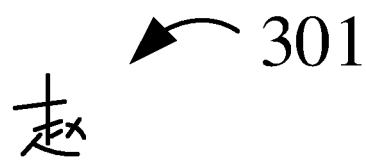
FIG. 3A shows a schematic diagram of a handwritten sample image according to an embodiment of the present disclosure.

FIG. 3A shows a schematic diagram of a handwritten sample image according to an embodiment of the present disclosure.

As shown in FIG. 3A, a handwritten sample image 301 corresponds to a text "赵 (Chinese character)".

Figure 3B:
FIG. 3B shows a schematic diagram of a handwritten text image according to an embodiment of the present disclosure.

FIG. 3B shows a schematic diagram of a handwritten text image according to an embodiment of the present disclosure.

As shown in FIG. 3B, a handwritten text image 302 corresponds to a preset text sequence "赵某昨日前往外地". The handwritten text image 302 includes a preset pixel 303, and the preset pixel 303 may be a pixel corresponding to an upper-left vertex of the handwritten text image 302.

Figure 3C:
FIG. 3C shows a schematic diagram of an inclined handwritten text image according to an embodiment of the present disclosure.

FIG. 3C shows a schematic diagram of an inclined handwritten text image according to an embodiment of the present disclosure.

As shown in FIG. 3C, an inclined handwritten text image 304 may be obtained by rotating the handwritten text image shown in FIG. 3B according to an inclination angle of 15°, for example.

Figure 3D:
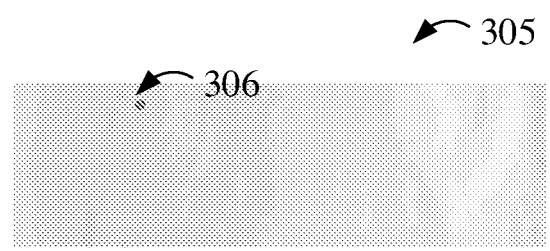
FIG. 3D shows a schematic diagram of a background image according to an embodiment of the present disclosure.

FIG. 3D shows a schematic diagram of a background image according to an embodiment of the present disclosure.

As shown in FIG. 3D, a background image 305 may be an image from a social networking site. A pixel 306 in the background image 305 may be determined as a target pixel.

FIG. 3E shows a schematic diagram of a target sample image according to an embodiment of the present disclosure.

As shown in FIG. 3E, the inclined handwritten text image 304 shown in FIG. 3C may be added to the background image 305 shown in FIG. 3D, for example. In the background image to which the inclined handwritten text image is added, the preset pixel 303 and the pixel 306 may coincide with each other. The vertex coordinate of the annotation box may be determined according to a coordinate of the pixel 306, the inclination angle (e.g., 15°), a width of the handwritten text image 302, and a height of the handwritten text image 302. An annotation box 307 is obtained according to the vertex coordinate of the annotation box. Next, a target sample image 308 may be obtained according to the annotation box 307, the inclined handwritten text image 304 and the background image 305.

In some embodiments, a plurality of handwritten sample images may be acquired to generate a handwritten sample library; a plurality of background images may be acquired to generate a background image library; and a plurality of preset text sequences may be acquired to generate a text library.

For example, before operation S210 of the method 200 is performed, a preset text sequence may be randomly acquired from the text library, and a background image may be acquired from the background image library. The at least one handwritten sample image is determined from the handwritten sample library according to the preset text sequence. After that, operation S210 may be performed.

FIG. 4 shows a flowchart of a method of recognizing a text according to an embodiment of the present disclosure.

As shown in FIG. 4, a method 400 may include operations S410 to S430.

In operation S410, a target detection is performed on a text image by using a detection model, so as to obtain a text image with a detection box.

For example, the detection box is used to represent a region in which a text of the text image is located.

For example, the detection model is trained according to a plurality of sample images generated by the method provided by the present disclosure.

In operation S420, the text image with the detection box is segmented to obtain a to-be-recognized image.

In embodiments of the present disclosure, the text image with the detection box may be cut according to the detection box, so as to obtain a partial text image containing the detection box.

For example, a bounding rectangle of the detection box may be determined according to the detection box. A width direction of the bounding rectangle is parallel to a width direction of a text image, and a height direction of the bounding rectangle is parallel to a height direction of the text image. A cutting may be performed according to the bounding rectangle, so as to obtain the partial text image containing the detection box.

In embodiments of the present disclosure, an affine transformation is performed on the partial text image to obtain a transformed image.

For example, the affine transformation is a linear transformation from a two-dimensional coordinate to a two-dimensional coordinate, so as to maintain a "straightness" and a "parallelism" of two-dimensional graphics. The straightness may mean that a transformed straight line is still a straight line without being bent, and a transformed arc is still an arc. The parallelism may mean that a relative positional relationship between the two-dimensional graphics is kept unchanged, two transformed parallel lines are still parallel lines, and an intersection angle between two intersecting lines after transformation is kept unchanged. The affine transformation may be implemented by translation, scaling, flipping, rotation, cutting, etc.

In embodiments of the present disclosure, a binarization processing is performed on the transformed image to obtain the to-be-recognized image.

For example, the transformed image includes a background and a text. A pixel value of a pixel corresponding to the background may be set to 0 and a pixel value of a pixel corresponding to the text may be set to 255 by various methods, so as to obtain the to-be-recognized image.

In operation S430, a text recognition is performed according to the to-be-recognized image, so as to obtain the text of the text image.

For example, the text recognition may be performed by using a recognition model.

Through embodiments of the present disclosure, the text image with the detection box output by the detection model is segmented, and a large amount of background information is removed, which may improve an accuracy of the text recognition.

In some embodiments, the recognition model is trained according to a plurality of recognition image samples. For example, according to the handwritten text image, a random noise information may be added by using a TextRenderer model so as to obtain the recognition image sample.

FIG. 5 shows a schematic diagram of a recognition image sample according to an embodiment of the present disclosure.

As shown in FIG. 5, a text in the recognition image sample may be different from the text in the target sample image shown in FIG. 3E, for example.

It may be understood that the detection model and the recognition model are trained separately.

Figure 6A:
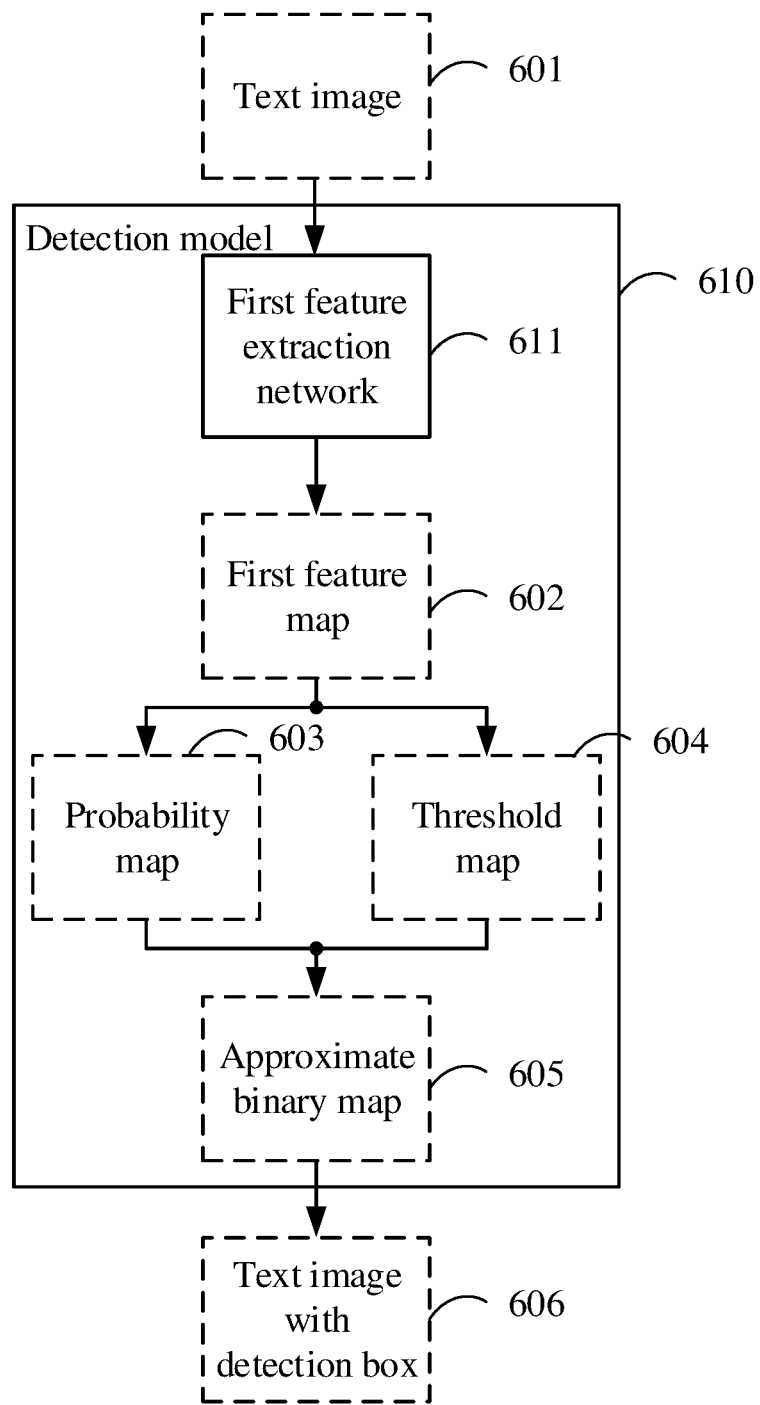
FIG. 6A shows a schematic diagram of a detection model according to an embodiment of the present disclosure.

FIG. 6A shows a schematic diagram of a detection model according to an embodiment of the present disclosure.

As shown in FIG. 6A, a detection model 610 may include a first feature extraction network 611. For example, the first feature extraction network may be a lightweight feature extraction network, such as ShuffleNet (Shuffle Network) V2.

The first feature extraction network may process a text image 601 to output a first feature map 602. Next, a probability map 603 and a threshold map 604 may be obtained according to the first feature map 602. An approximate binary map 605 may be obtained according to the probability map 603 and the threshold map 604. For example, each feature value in the first feature map 602 corresponds to a probability value in the probability map 603, also corresponds to a threshold value in the threshold map 604, and also corresponds to a pixel value in the approximate binary map 605. In an example, for a feature value Feat_i, if a probability value Prob_i corresponding to the feature value Feat_i is greater than or equal to a threshold value Th_i corresponding to the feature value Feat_i, then a pixel value Pix_i corresponding to the feature value is 255. In an example, for another feature value Feat_j, if a probability value Prob_j corresponding to the feature value Feat_j is less than a threshold value Th_j corresponding to the feature value, then a pixel value Pix_j corresponding to the feature value Feat_j is 0. In a similar way, each pixel value in the approximate binary map 605 may be obtained according to the probability map 603 and the threshold map 604.

Next, a text image 606 with a detection box may be obtained according to the approximate binary map 605. The lightweight feature extraction network is adopted in the detection model, which may improve a detection efficiency, while the probability map and the threshold map are used for processing, which may improve a detection accuracy.

In some embodiments, the text image 606 with the detection box is segmented to obtain the to-be-recognized image.

Figure 6B:
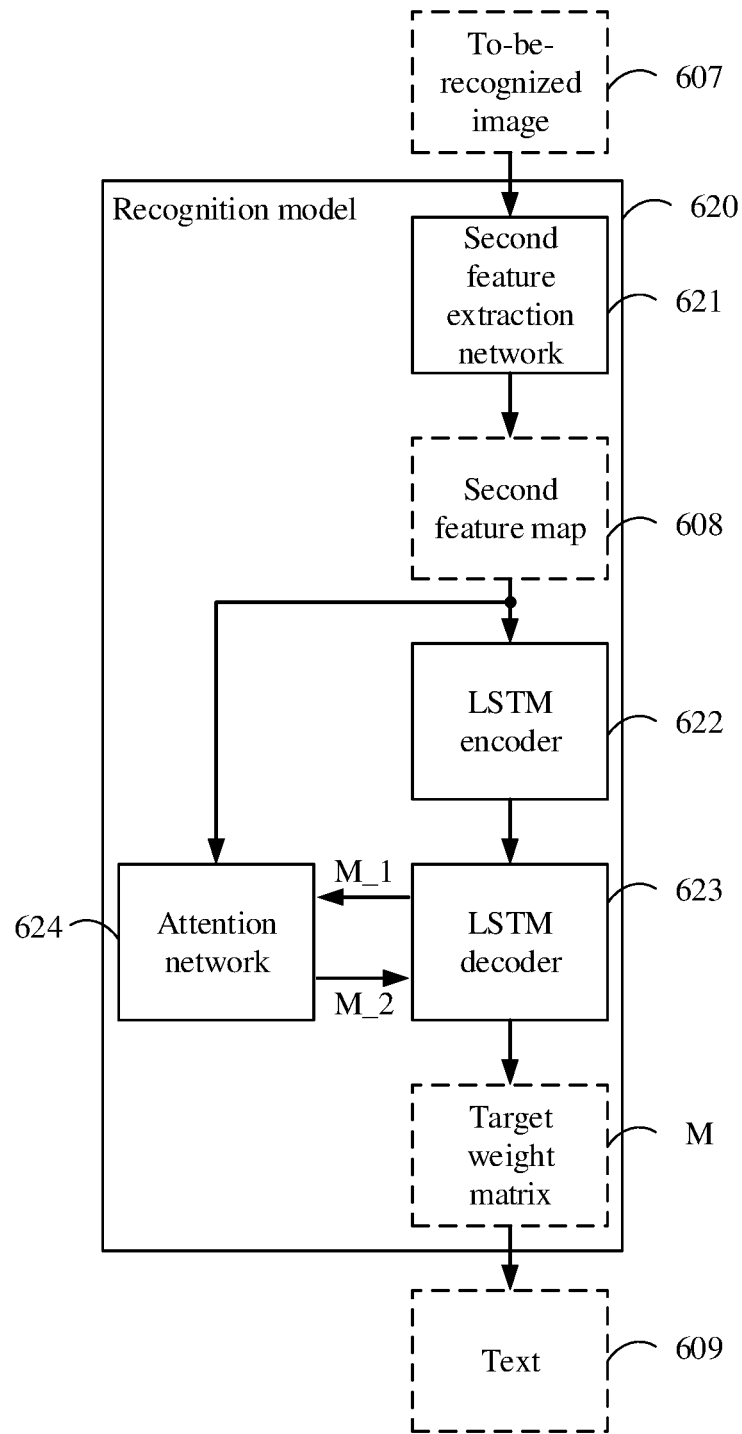
FIG. 6B shows a schematic diagram of a recognition model according to an embodiment of the present disclosure.

FIG. 6B shows a schematic diagram of a recognition model according to an embodiment of the present disclosure.

As shown in FIG. 6B, a recognition model 620 may include a second feature extraction network 621, an LSTM (Long and Short Term Memory) encoder 622, an LSTM decoder 623 and an attention network 624.

The second feature extraction network 621 may be a lightweight feature extraction network, such as MobileNet (Mobile Network). The second feature extraction network 621 may process a to-be-recognized image 607 to output a second feature map 608. The second feature map 608 may be input into the LSTM encoder 622 and the attention network 624, respectively.

The LSTM encoder 622 may include 256 LSTM encoding layers, and each LSTM encoding layer is used to encode an input feature. The LSTM decoder 623 may include 32 LSTM decoding layers, and each LSTM decoding layer is used to decode an input feature. An output of the LSTM decoder 623 may be a weight matrix M_1.

The attention network 624 may be constructed according to 2D Attention (a two-dimensional attention mechanism). The attention network 624 may output a weight matrix M_2 based on the second feature map 608 and the weight matrix M_1. The LSTM decoder 623 may output a target weight matrix M based on the weight matrix M_1 and the weight matrix M_2. In an example, the LSTM decoder 623 may add the weight matrix M_1 and weight matrix M_2 to output the target weight matrix M.

A text 609 of the text image may be obtained according to the target weight matrix M. The recognition model may adopt the lightweight feature extraction network, and thus the number of parameters of the encoder and the decoder may be reduced, an efficiency of a model may be further improved.

Figure 7:
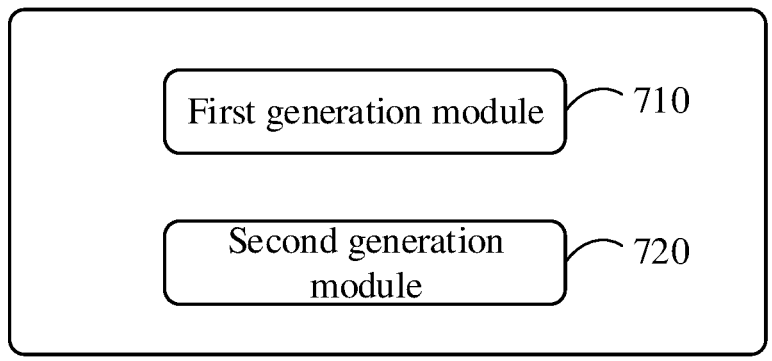
FIG. 7 shows a block diagram of an apparatus of generating an image sample according to an embodiment of the present disclosure.

FIG. 7 shows a block diagram of an apparatus of generating an image sample according to an embodiment of the present disclosure.

As shown in FIG. 7, an apparatus 700 may include a first generation module 710 and a second generation module 720.

The first generation module 710 is used to generate a handwritten text image according to at least one handwritten sample image.

The second generation module 720 is used to generate a target sample image with an annotation box according to the handwritten text image and a background image. For example, the annotation box is used to represent a region in which the handwritten text image is located in the background image.

In some embodiments, the second generation module includes: an adding sub module used to add an inclined handwritten text image to the background image, where the inclined handwritten text image is obtained by rotating the handwritten text image; a first generation sub module used to generate the annotation box according to the inclined handwritten text image; and a second generation sub module used to generate the target sample image according to the annotation box.

In some embodiments, the adding sub module includes: a first determination unit used to determine a target pixel. For example, the target pixel is in the background image. The adding sub module includes: an adding unit used to add the inclined handwritten text image to the background image according to the target pixel and a preset pixel in the inclined handwritten text image.

In some embodiments, the first generation sub module includes: a second determination unit used to determine a width of the handwritten text image and a height of the handwritten text image according to a handwritten sample attribute. For example, the handwritten sample attribute includes a height of the handwritten sample image and a width of the handwritten sample image. The first generation sub module includes: a third determination unit used to determine a vertex coordinate of the annotation box according to a coordinate of the target pixel, an inclination angle of the inclined handwritten text image, and the width of the handwritten text image and the height of the handwritten text image; and a first generation unit used to generate the annotation box according to the vertex coordinate of the annotation box.

In some embodiments, the first generation module includes: a first determination sub module used to determine the at least one handwritten sample image according to a preset text sequence; and a third generation sub module used to generate the handwritten text image according to the at least one handwritten sample image and a handwritten sample attribute. For example, the handwritten sample attribute includes a height of the handwritten sample image and a width of the handwritten sample image.

In some embodiments, the second generation sub module includes: a second generation unit used to generate the target sample image according to the annotation box, the inclined handwritten text image and the background image.

Figure 8:
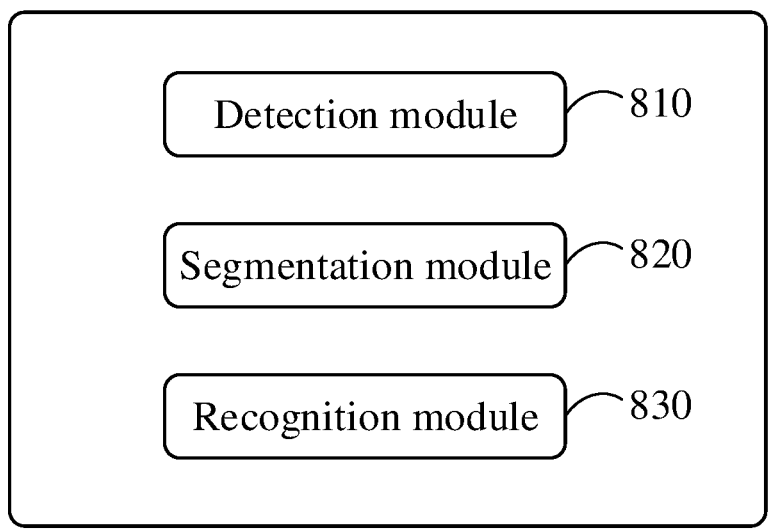
FIG. 8 shows a block diagram of an apparatus of recognizing a text according to an embodiment of the present disclosure.

FIG. 8 shows a block diagram of an apparatus of recognizing a text according to another embodiment of the present disclosure.

As shown in FIG. 8, an apparatus 800 may include a detection module 810, a segmentation module 820, and a recognition module 830.

The detection module 810 is used to perform a target detection on a text image by using a detection model, so as to obtain a text image with a detection box. For example, the detection box is used to represent a region in which a text of the text image is located.

The segmentation module 820 is used to segment the text image with the detection box to obtain a to-be-recognized image.

The recognition module 830 is used to perform a text recognition according to the to-be-recognized image, so as to obtain the text of the text image.

For example, the detection model is trained according to a plurality of sample images generated by the apparatus provided by the present disclosure.

In some embodiments, the segmentation module includes: a cutting sub module used to cut the text image with the detection box according to the detection box, so as to obtain a partial text image containing the detection box; an affine transformation sub module used to perform an affine transformation on the partial text image to obtain a transformed image; a binarization processing sub module used to perform a binarization processing on the transformed image to obtain the to-be-recognized image.

In the technical solution of the present disclosure, an acquisition, a storage, a use, a processing, a transmission, a provision, a disclosure and an application of user personal information involved comply with provisions of relevant laws and regulations, and do not violate public order and good custom.

In the technical solution of the present disclosure, a user's authorization or consent is acquired before the user personal information is acquired or collected.

According to embodiments of the present disclosure, the present disclosure further provides an electronic device, a readable storage medium and a computer program product.

Figure 9:
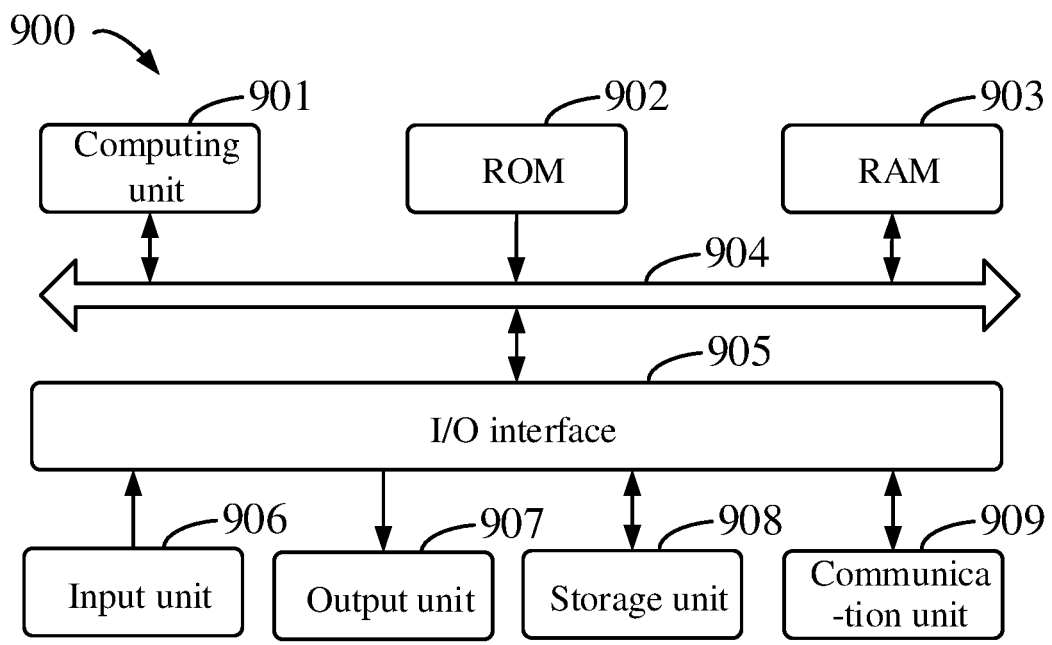
FIG. 9 shows a block diagram of an electronic device for implementing a method of generating an image sample and/or a method of recognizing a text according to an embodiment of the present disclosure.

FIG. 9 shows a schematic block diagram of an exemplary electronic device 900 for implementing embodiments of the present disclosure. The electronic device is intended to represent various forms of digital computers, such as a laptop computer, a desktop computer, a workstation, a personal digital assistant, a server, a blade server, a mainbox computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 9, an electronic device 900 includes a computing unit 901 which may perform various appropriate actions and processes according to a computer program stored in a read only memory (ROM) 902 or a computer program loaded from a storage unit 908 into a random access memory (RAM) 903. In the RAM 903, various programs and data necessary for an operation of the electronic device 900 may also be stored. The computing unit 901, the ROM 902 and the RAM 903 are connected to each other through a bus 904. An input/output (I/O) interface 905 is also connected to the bus 904.

A plurality of components in the electronic device 900 are connected to the I/O interface 905, including: an input unit 906, such as a keyboard, or a mouse; an output unit 907, such as displays or speakers of various types; a storage unit 908, such as a disk, or an optical disc; and a communication unit 909, such as a network card, a modem, or a wireless communication transceiver. The communication unit 909 allows the electronic device 900 to exchange information/data with other devices through a computer network such as Internet and/or various telecommunication networks.

The computing unit 901 may be various general-purpose and/or dedicated processing assemblies having processing and computing capabilities. Some examples of the computing units 901 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 901 executes various methods and steps described above, such as the method of generating the image sample and/or the method of recognizing the text. For example, in some embodiments, the method of generating the image sample and/or the method of recognizing the text may be implemented as a computer software program which is tangibly embodied in a machine-readable medium, such as the storage unit 908. In some embodiments, the computer program may be partially or entirely loaded and/or installed in the electronic device 900 via the ROM 902 and/or the communication unit 909. The computer program, when loaded in the RAM 903 and executed by the computing unit 901, may execute one or more steps in the method of generating the image sample and/or the method of recognizing the text described above. Alternatively, in other embodiments, the computing unit 901 may be configured to perform the method of generating the image sample and/or the method of recognizing the text by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

A computer system may include a client and a server. The client and the server are generally far away from each other and usually interact through a communication network. The relationship between the client and the server is generated through computer programs running on the corresponding computers and having a client-server relationship with each other.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of generating an image sample, the method comprising:
   generating a handwritten text image according to at least one handwritten sample image; and
   generating a target sample image with an annotation box, according to the handwritten text image and a background image, wherein the annotation box is configured to represent a region in which the handwritten text image is located in the background image,
   wherein the generating the target sample image comprises:
      adding an inclined handwritten text image to the background image, wherein the inclined handwritten text image is obtained by rotating the handwritten text image and wherein the adding the inclined handwritten text image comprises:
         determining a target pixel in the background image, and
         adding the inclined handwritten text image to the background image according to the target pixel and a preset pixel in the inclined handwritten text image;
      generating the annotation box according to the inclined handwritten text image; and
      generating the target sample image according to the annotation box.

2. The method according to claim 1, wherein the generating the annotation box according to the inclined handwritten text image comprises:
   determining a width of the handwritten text image and a height of the handwritten text image according to a handwritten sample attribute, wherein the handwritten sample attribute comprises a height of the handwritten sample image and a width of the handwritten sample image;
   determining a vertex coordinate of the annotation box according to a coordinate of the target pixel, an inclination angle of the inclined handwritten text image, the width of the handwritten text image and the height of the handwritten text image; and
   generating the annotation box according to the vertex coordinate of the annotation box.

3. The method according to claim 1, wherein the generating a handwritten text image according to at least one handwritten sample image comprises:
   determining the at least one handwritten sample image according to a preset text sequence; and
   generating the handwritten text image according to the at least one handwritten sample image and a handwritten sample attribute, wherein the handwritten sample attribute comprises a height of the handwritten sample image and a width of the handwritten sample image.

4. The method according to claim 1, wherein the generating the target sample image according to the annotation box comprises generating the target sample image according to the annotation box, the inclined handwritten text image and the background image.

5. A method of recognizing a text, the method comprising:
   performing a target detection on a text image by using a detection model, so as to obtain a text image with a detection box, wherein the detection box is configured to represent a region in which a text of the text image is located;
   segmenting the text image with the detection box to obtain a to-be-recognized image; and
   performing a text recognition according to the to-be-recognized image, so as to obtain the text of the text image,
   wherein the detection model is trained according to a plurality of image samples generated by the method according to claim 1.

6. The method according to claim 5, wherein the segmenting the text image with the detection box to obtain a to-be-recognized image comprises:
   cutting the text image with the detection box according to the detection box, so as to obtain a partial text image containing the detection box;
   performing an affine transformation on the partial text image to obtain a transformed image; and
   performing a binarization processing on the transformed image to obtain the to-be-recognized image.

7. An electronic device, comprising:
   at least one processor; and
   a memory communicatively connected to the at least one processor, wherein the memory stores instructions executable by the at least one processor, and the instructions, when executed by the at least one processor, are configured to cause the at least one processor to implement at least the method of claim 5.

8. The electronic device according to claim 7, wherein the instructions are further configured to cause the at least one processor to at least:
   cut the text image with the detection box according to the detection box, so as to obtain a partial text image containing the detection box;
   perform an affine transformation on the partial text image to obtain a transformed image; and
   perform a binarization processing on the transformed image to obtain the to-be-recognized image.

9. A non-transitory computer-readable storage medium having computer instructions therein, wherein the computer instructions are configured to cause a computer system to implement at least the method of claim 5.

10. The non-transitory computer-readable storage medium according to claim 9, wherein the computer instructions are further configured to cause the computer system to at least:
    cut the text image with the detection box according to the detection box, so as to obtain a partial text image containing the detection box;
    perform an affine transformation on the partial text image to obtain a transformed image; and
    perform a binarization processing on the transformed image to obtain the to-be-recognized image.

11. An electronic device, comprising:
    at least one processor; and
    a memory communicatively connected to the at least one processor,
    wherein the memory stores instructions executable by the at least one processor, and the instructions, when executed by the at least one processor, are configured to cause the at least one processor to implement at least the method of claim 1.

12. The electronic device according to claim 11, wherein the instructions are further configured to cause the at least one processor to at least:
- determine a width of the handwritten text image and a height of the handwritten text image according to a handwritten sample attribute, wherein the handwritten sample attribute comprises a height of the handwritten sample image and a width of the handwritten sample image;
- determine a vertex coordinate of the annotation box according to a coordinate of the target pixel, an inclination angle of the inclined handwritten text image, the width of the handwritten text image and the height of the handwritten text image; and
- generate the annotation box according to the vertex coordinate of the annotation box.

13. The electronic device according to claim 11, wherein the instructions are further configured to cause the at least one processor to at least:
- determine the at least one handwritten sample image according to a preset text sequence; and
- generate the handwritten text image according to the at least one handwritten sample image and a handwritten sample attribute, wherein the handwritten sample attribute comprises a height of the handwritten sample image and a width of the handwritten sample image.

14. The electronic device according to claim 11, wherein the instructions are further configured to cause the at least one processor to at least generate the target sample image according to the annotation box, the inclined handwritten text image and the background image.

15. A non-transitory computer-readable storage medium having computer instructions therein, wherein the computer instructions are configured to cause a computer system to at least:
- generate a handwritten text image according to at least one handwritten sample image; and
- generate a target sample image with an annotation box, according to the handwritten text image and a background image, wherein the annotation box is configured to represent a region in which the handwritten text image is located in the background image, wherein the generation of the target sample image comprises:
- addition of an inclined handwritten text image to the background image, wherein the inclined handwritten text image is obtained by rotation of the handwritten text image and wherein the addition of the inclined handwritten text image comprises:
  - determination of a target pixel in the background image, and
  - addition of the inclined handwritten text image to the background image according to the target pixel and a preset pixel in the inclined handwritten text image;
- generation of the annotation box according to the inclined handwritten text image; and
- generation of the target sample image according to the annotation box.

16. The non-transitory computer-readable storage medium according to claim 15, wherein the instructions are further configured to cause the computer system to at least:
- determine a width of the handwritten text image and a height of the handwritten text image according to a handwritten sample attribute, wherein the handwritten sample attribute comprises a height of the handwritten sample image and a width of the handwritten sample image;
- determine a vertex coordinate of the annotation box according to a coordinate of the target pixel, an inclination angle of the inclined handwritten text image, the width of the handwritten text image and the height of the handwritten text image; and
- generate the annotation box according to the vertex coordinate of the annotation box.

17. The non-transitory computer-readable storage medium according to claim 15, wherein the instructions are further configured to cause the computer system to at least:
- determine the at least one handwritten sample image according to a preset text sequence; and
- generate the handwritten text image according to the at least one handwritten sample image and a handwritten sample attribute, wherein the handwritten sample attribute comprises a height of the handwritten sample image and a width of the handwritten sample image.

18. The non-transitory computer-readable storage medium according to claim 15, wherein the instructions are further configured to cause the computer system to at least generate the target sample image according to the annotation box, the inclined handwritten text image and the background image.

* * * * *